United States Patent

Warner

[15] 3,688,093
[45] Aug. 29, 1972

[54] COUNTER MECHANISM

[72] Inventor: Dale J. Warner, 5700 S. Naragarsett, Chicago, Ill. 60638

[22] Filed: Feb. 11, 1971

[21] Appl. No.: 114,582

[52] U.S. Cl. .......... 235/103.5 R, 235/1 C, 235/92 EV
[51] Int. Cl. .............................................. G06m 3/14
[58] Field of Search ......... 235/103.5, 103, 1 C, 92 C, 235/92 EV, 92 MP

[56] References Cited

UNITED STATES PATENTS

| | | |
|---|---|---|
| 923,511 | 6/1909 | Greenbaum ........ 235/103.5 R |
| 1,039,564 | 9/1912 | Matthews et al. ... 235/103.5 R |
| 2,720,361 | 10/1955 | Halley ................ 235/103.5 R |
| 2,969,502 | 1/1961 | Andresen, Jr. ...... 235/103.5 R |
| 3,022,943 | 2/1962 | Dunn .................. 235/92 EV |
| 3,083,570 | 4/1963 | Truman ............... 235/103.5 R |

*Primary Examiner*—Stephen J. Tomsky
*Attorney*—Hill, Sherman, Meroni, Gross & Simpson

[57] ABSTRACT

A counter mechanism employs a pair of sun gears which orbit respective ratchet-driven index gears to move a common coupling element differentially about an axis of rotation. The coupling element is carried by a shaft which extends along the axis of rotation and which is provided with a differential angular position in accordance with algebraically additive pulses received by solenoid devices for indexing the index gears. The counter mechanism is provided with a clock-type having a units pointer carried by a rotatable shaft and a hundreds pointer carried by a sleeve which is rotatably carried about the units pointer shaft. The differentially indexed shaft is connected to the units pointer shaft and to the concentric sleeve by gear means to provide a 20:1 ratio for the angular position of the units pointer with respect to the hundreds pointer. A reset knob is provided on the units pointer shaft for manually positioning the units and hundreds pointers.

14 Claims, 4 Drawing Figures

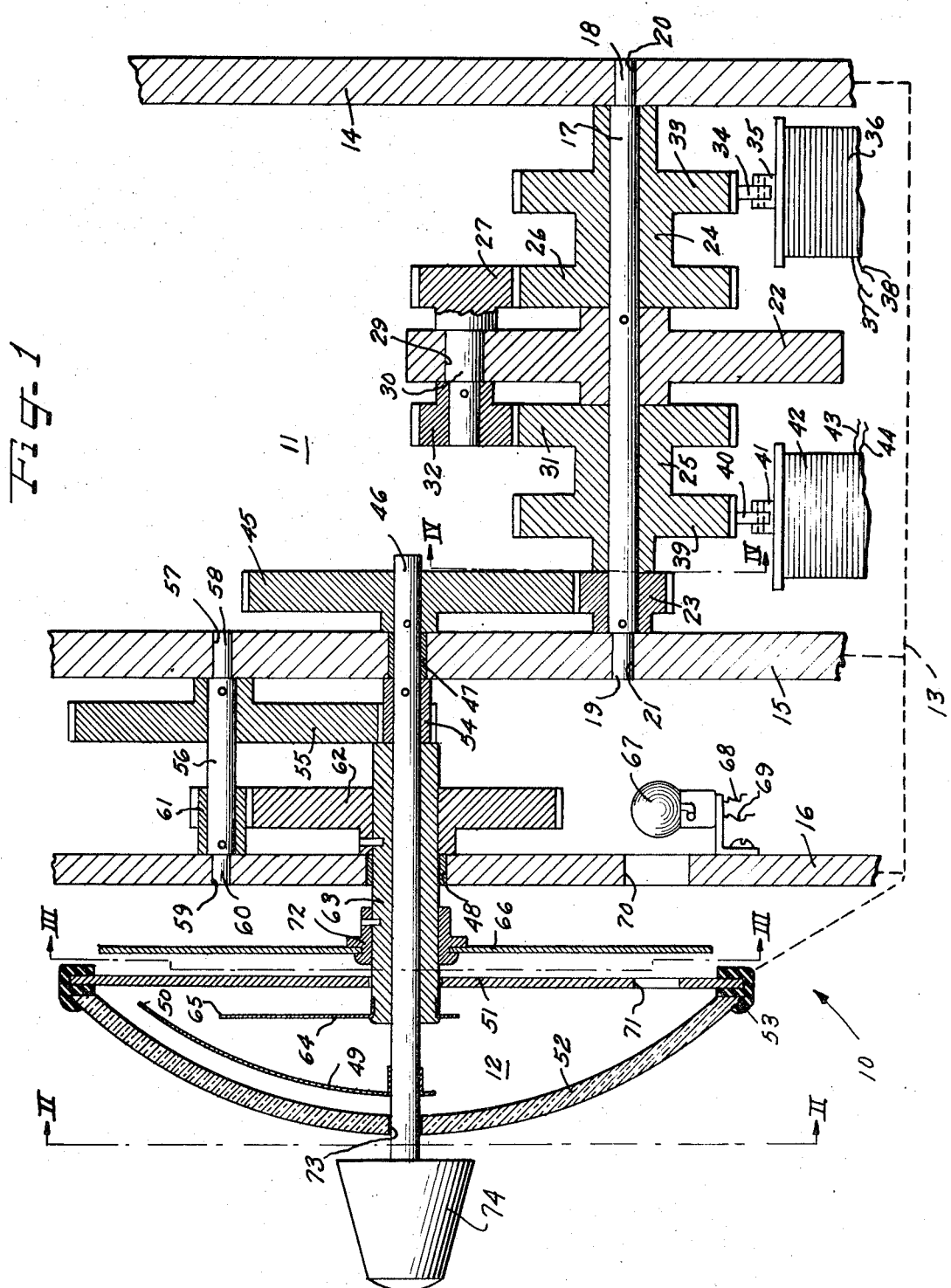

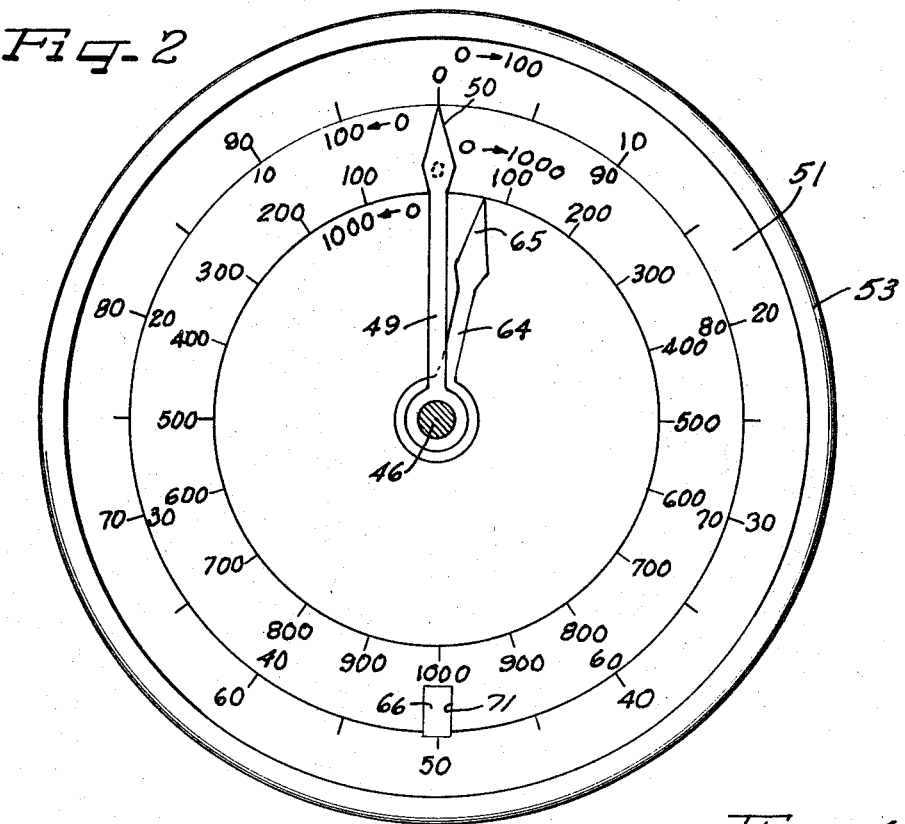
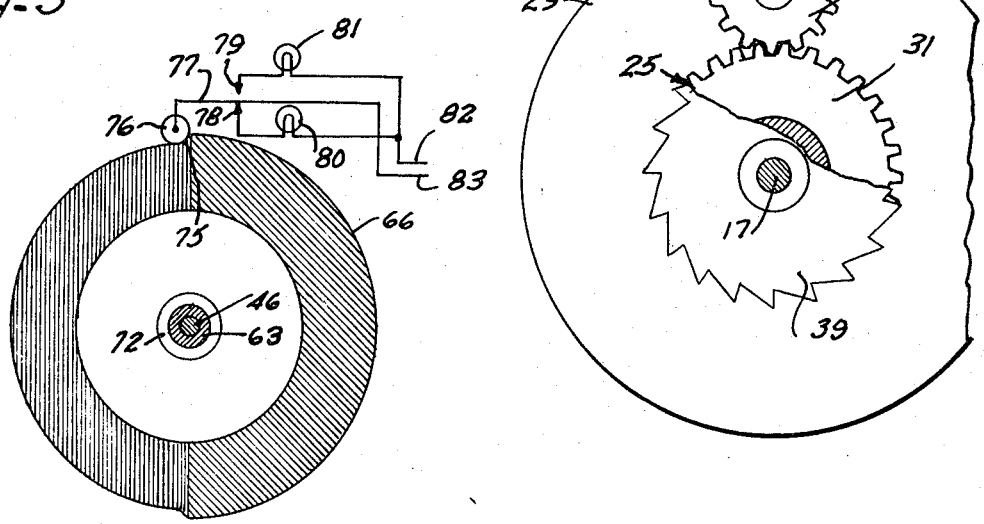

3,688,093

COUNTER MECHANISM

BACKGROUND OF THE INVENTION

1. Field of the Invention

This invention relates to a counter mechanism, and more particularly to a differential counter mechanism having a clock-type indicator dial.

2. Description of the Prior Art

Differential counters are generally known in the art and have been used to particular advantage in analyzing and increasing rates of production. In such an environment, a counter is usually provided with a periodic input at a frequency that is indicative of a desired production rate and a second input at the actual production rate, whereby a differential output is obtained which indicates whether production is on schedule or lagging behind schedule.

The differential counters of the prior art have taken many forms including mechanical, electro-mechanical and hybrid types including almost purely electronic components. An electro-mechanical differential counter is disclosed by Ernest et al. in their U.S. Pat. No. 3,112,067 wherein a dial face has associated therewith a units pointer carried by a differentially incremented shaft. The shaft is driven in opposite directions by a pair of solenoid-driven ratchet gear having a bevel gear commonly carried therebetween, which bevel gear orbits between the ratchet-driven gears and is rotatable about its own shaft which is fixed normal to the incrementally driven shaft. A pair of cams operate respective switches to energize a second set of solenoids for indexing a hundred pointer of a second dial face. It is readily apparent that this system could be carried forward through cams and switches to control the position of a thousands pointer and so on.

SUMMARY OF THE INVENTION

It has been found that it is highly desirable to have all of the information available for readout at a single concentrated location and further advantageous to provide the information to a single dial. It is also been determined that it is highly advantageous to have such a single dial constructed in the form of an ordinary clock dial for ease of understanding and reading. It is therefore a primary object of the present invention to provide a counter mechanism having a clock-type dial which carries indicia of units and hundreds and a pair of associated pointers having a common axis of rotation similar to that of clock hands.

While it is advantageous to have an accurate differential count displayed as set forth above, it is also advantageous to have available a single indication which represents a lead or lag of production with respect to the desired production schedule. This latter indication is further advantageous if such is provided for a scanned or casual view and is visible at some distance from the counter mechanism. It is therefore a further object of the invention to provide a counter mechanism having a single indication of production with respect to a production norm, which indication is visible at a distance from the counter mechanism.

In order to realize the foregoing and other objectives of the invention, a counter mechanism is provided which includes a first solenoid index gear which may be operated, for example, by periodically recurring pulses at a desired rate of production, a second solenoid driven index gear which may be operated by a pulse which is generated in accordance with actual unit production, a shaft mounting the index gears for rotation relative thereto and carrying an apertured member which has a shaft rotatably disposed in the aperture and mounting a pair of sun gears for engaging and orbiting respective ones of the index gears. The shaft which carries the apertured member is thereby differentially indexed.

The counter mechanism is provided with a clock-type dial having indicia including a units scale and a hundreds scale. Associated with the units scale and the hundreds scale are respective units and hundreds pointers which are carried by a units pointer shaft and a sleeve concentric with that shaft, respectively. The units pointer shaft and the concentric sleeve are connected by gear means to the differentially incremented shaft to move two pointers at 20:1 ratio.

A wheel is also carried by and rotatable with the concentric sleeve and includes first and second color portions separated diametrically of the wheel as a part of means for providing a visual single indication of production. The color wheel is constructed of a light transmitting material which transmits light from a lamp within the counter mechanism through an aperture in the dial face to provide the desired indication. As an alternative, the color wheel may be replaced by a cam which operates a transfer switch to selectively energize a pair of lamps to provide the same type of information.

BRIEF DESCRIPTION OF THE DRAWINGS

The foregoing and other objects, features and advantages of the invention, its organization, construction and operation will be best understood from the following detailed description of exemplary embodiments thereof taken in conjunction with the accompanying drawing, in which:

FIG. 1 is a elevational view, in section, of a counter mechanism constructed in accordance with the principles of the present invention; and FIG. 2 is a sectional view taken along the line II—II of FIG. 1 particularly illustrating the clock-type dial face; the indicia carried thereon and the units and hundreds pointers of the counter mechanism;

FIG. 3 is a sectional view taken along the line III—III of FIG. 1, particularly illustrating the color wheel of the counter mechanism and further illustrating, in schematic form, the alternative wherein the color wheel is a cam wheel for selectively operating a pair of lamps; and FIG. 4 is a sectional view taken along the line IV—IV of FIG. 1, particularly illustrating an index gear, a sun gear, and the common member between the indexing mechanisms for incrementally indexing the counter mechanism.

DESCRIPTION OF THE PREFERRED EMBODIMENTS

Referring to FIG. 1, a differential counter, generally referenced 10, is illustrated as comprising a motor section 11 for driving an indicator section 12.

The motor section 11 and the indicator section 12 are mounted in a housing, generally indicated by the broken line 13, which includes a plurality of walls 14, 15 and 16.

The motor section 11 includes a shaft 17 having an end portion 18 rotatably mounted in an aperture 20 of the wall 14, and an end portion 19 rotatably mounted in an aperture 21 in the wall 15. An annular member 22 and a gear 23 are secured to the shaft 17 in spaced relation for rotation with the shaft 17. A pair of index gears 24 and 25 are carried on the shaft 17 for rotation thereabout. The index gear 24 includes a gear portion 26 which engages a gear 27 which is fixed to a shaft 30. the index gear 25 includes a gear portion 31 which engages a gear 42 that is also secured to the shaft 30. The shaft 30 is rotatably mounted in an aperture 29 of the member 22, whereby the gears 27 and 32 are therefore provided as sun gears for orbiting the gear portions 26 and 31 of the index gears 24 and 25 respectively and carry therewith the member 22 to rotate the shaft 17.

In order to differentially position the shaft 17, the index gears 24 and 25 are provided with respective ratchet portions 33 and 39 for engaging respective pawls 34 and 40. The pawl 34 is carried by an extensible armature 35 of a solenoid 36 which receives energizing pulses by way of a pair of conductors 37 and 38. The pawl 40 is likewise mounted on an extensible armature 41 of the solenoid 42 which receives energizing pulses by way of a pair of electrical conductors 43 and 44. As viewed from the front of the counter, and which will be evident from the following discussion, a clockwise rotation of the index gear 24 in response to pulses applied to conductors 37 and 38 will result in a clockwise movement of the units pointer 49 and the hundreds pointer 64, whereas a clockwise movement of the index gear 25 in response to the application of a pulse to the conductors 43 and 44 will produce a counter-clockwise movement of the pointers 49 and 64. Each indexing movement rotates the units pointer 49 1/100 of a revolution representing either a unit of work produced or an expected unit of production.

A shaft 46 is rotatably mounted in an aperture 47 in the wall 15 and carries fixed at one end thereof a gear 45 which is in driving engagement with the gear 23. The shaft 46 extends through an aperture 48 in the wall 16 and carries fixed thereto near the other end thereof the units pointer 49 referred to above. The units pointer 49 includes a tip 50 which is directed toward a units scale on the face of a dial 51. The units scale proceeds from the 12 o'clock position in both directions toward 100. The dial 51 is covered by a dome-shaped glass or plastic member 52 and the dial 51 and the member 52 are sealed with a gasket 53 to the housing 13 to protect the instrument from foreign matter.

The shaft 46 also carries fixed thereto a gear 54 which engages a gear 55 mounted on a shaft 56. The shaft 56 includes a pair of ends 58 and 60 which are rotatably secured in apertures 57 and 59 of the walls 15 and 16. The shaft 56 further carries fixed thereto a gear 61 which is in driving engagement with a gear 62 which is fixed to a sleeve 63. The sleeve 63 is rotatably carried on the shaft 46 and has mounted thereon the hundreds pointer 64 having a tip 65 which is directed toward a hundreds scale which is carried on the face of the dial 51 and circumscribed by the units scale.

The rotation of the units pointer shaft 46 is converted for example by a 20:1 gear ratio through the gears 54, 55, 61 and 62 so that one complete revolution of the shaft 46 produces one-twentieth revolution (18) of the outer shaft or sleeve 63 and the pointer 64 for indicating accumulative rotations of the shaft 46 and the pointer 49.

The shaft 46 extends through an aperture 73 in the dome-shaped member 52 and has secured to the extended end thereof, a manually operable setting knob 74. If the mechanism is manually set with the pointers 49 and 64 directed at their respective "0" settings, and series of impulses are applied to the solenoids 36 and 42, the pointers will indicate the difference between the numbers of impulses applied to each of these solenoids. This difference will be indicated by the "ahead" or "behind" status of the pointers 64 and 49, clockwise displacement representing the ahead status and counter-clockwise displacement representing the behind status.

In order to further indicate the general count status, the sleeve 63 has affixed thereto by the attaching means 72 a wheel 66. The wheel 66 is constructed of a light transmitting material, and as seen in FIG. 3 includes diametrically separated sections of contrasting color. A lamp 67 is mounted to a wall 16 and is energized by a suitable supply connected to a pair of electrical conductors 68 and 69 to provide a source of light through an aperture 70 in the wall 16 for transmission through the color wheel 66. The light transmitted through the color wheel 66 is further visible through an aperture 71 in the dial 51 (FIGS. 1 and 2). The light shining through the face of the dial 51 indicates, by its color, the count status at a glance and is visible at a distance from the counter.

As an alternative construction, FIG. 3 illustrates that the wheel 66 may be provided as a cam to operate a wheeled follower 66 at point 75 to selectively connect the contact 77 to either of a pair of contacts 78 and 79. With the connections so established, the provision of electrical energy at a pair of conductors 82 and 83 will effect selective illumination of a pair of lamps 80 and 81 which are preferably of different colors and may be mounted at a suitable position on the dial 51 or elsewhere as desired on the housing 13 for visual access.

the foregoing has described a counter which provides a clock-type indication of differential or accumulated pulse count which is highly advantageous for use in production lines. The counter is particularly provided with means for reading an accurate differential pulse count and means for reading, at a glance or from a distance, the general pulse count status.

Many changes and modifications may be made in the invention by one skilled in the art without departing from the spirit and scope of the invention, and it is to be understood that I intend to include within the patent warranted hereon all such changes and modifications as may reasonably and properly be included within the scope of my contribution to the art.

What I claim as my invention is:

1. A pulse counter comprising: a housing; a shaft rotatably mounted in said housing; index gear means coaxially mounted on said shaft shaft for rotation relative thereto, said index gear meams including a first gear, and a ratchet gear connected to said first gear; driving means coupled to said index gear means, said drive means including a reciprocally movable pawl operatively engaging said ratchet gear, and a solenoid adapted to receive pulses and operable in response to a pulse to move said pawl; a member mounted on said shaft for rotation and having an aperture therethrough spaced radially from said shaft; a second gear engaging said first gear and including a shaft portion extending through the aperture of said member for rotation therein to effect rotation of said shaft; an indication panel having indicia thereon representing pulse count; a pointer disposed adjacent said indicator panel; and means coupling said shaft to said pointer.

2. A pulse counter according to claim 1, comprising: second index gear means coaxially mounted on said shaft for rotation relative thereto, said second index gear means including a third gear, and a second ratchet gear connected to said third gear; and second driving means, said second driving means including a second reciprocally movable pawl operatively engaging said second ratchet gear for rotation opposite the first-mentioned ratchet gear, and a second solenoid adapted to receive pulses and operable in response to a pulse to move said second pawl.

3. A pulse counter according to claim 1, wherein the indicia on said indicator panel includes units indicia and hundreds indicia and said pointer is a units pointer associated with said units indicia, and comprising: a hundreds pointer disposed adjacent said indicator panel; and means coupling said shaft to said hundreds pointer including a gear train having a 20:1 reduction ratio.

4. A differential impulse counter comprising: an indicator dial having indicia thereon representing pulse count; a pointer disposed adjacent said dial for indicating accumulated pulse count; means coupled to said pointer for moving said pointer relative said dial; a rotatable shaft connected to said coupling means; a member secured to said shaft and rotatable therewith, and having an aperture therein; a pair of first gears disposed on opposite sides of said member and connected together through the aperture; a pair of second gears rotatably carried on said shaft and engaging respective first gears, and each including a ratchet portion; and a pair of solenoid means each adapted to receive pulses and each including a pawl for drivingly engaging respective ratchet portions of said second gears for rotation in respective opposite directions, in response to pulses applied to said solenoids thereby effecting rotation of said shaft in respective opposite directions.

5. A differential impulse counter according to claim 4, wherein said means coupled to said pointer for moving said pointer relative to said shaft includes: a manually operable knob, and a shaft carrying said knob and said pointer.

6. A differential impulse counter according to claim 4, wherein the indicia includes units and hundreds indicia and wherein said counter further comprises: a hundreds pointer disposed adjacent said dial; and means coupling said shaft and said hundreds pointer to indicate differential accumulation of hundreds of pulses.

7. A differential impulse counter according to claim 6, wherein said dial includes means defining an aperture therein; and said counter comprises a second member coupled to said hundreds pointer and movable therewith, said member disposed adjacent said dial and visible through the aperture in said dial, and including colored portions indicative of the direction of count accumulation.

8. A differential in pulse counter according to claim 7, comprising: a light source; and wherein said colored portions of said second member include light transmitting material.

9. An impulse counter comprising: a housing including first, second and third walls; a first shaft rotatably mounted by said first and second walls; a pair of index gears each carried coaxially on said shaft for rotation about said shaft and each including a first gear, and a ratchet gear connected to said first gear; a pair of solenoids within said housing and each including a movable pawl for engaging a respective ratchet gear for rotating the respective ratchet gear in a direction opposite to that of the other ratchet gear, and a winding for receiving energizing pulses coupled to said pawl for operating said pawl to rotate the respective index gear; and a member fixed to said shaft for mutual rotation including means defining an aperture in said member; a pair of sun gears engaging respective ones of said first gears for rotation thereabout and connected via the aperture in said member for rotation therein; and means connected to said shaft for translating the angular position thereof into an indication of differential pulse count accumulation.

10. An impulse counter according to claim 9, wherein the last-mentioned means includes a dial connected to said housing, said dial carrying indicia thereon representing pulse counts, a pointer disposed adjacent said dials and its indicia, and a pointer shaft coupled to the first-mentioned shaft and rotatably mounted to said second and third walls and carrying said pointer.

11. An impulse counter according to claim 10, wherein said last-mentioned means includes a manually operable knob carried on said pointer shaft for manual setting of said pointer.

12. An impulse counter according to claim 10, wherein the indicia includes units and hundreds scales and said pointer in a units pointer associated with said units scale, comprising a hundreds pointer disposed adjacent said dial; a sleeve mounted for rotation on said pointer shaft and carrying said hundreds pointer; and hundreds count coupling means connected between the first-mentioned shaft and said sleeve including means for converting the angular position of the first-mentioned shaft into a corresponding movement of said hundreds pointer along said hundreds scale.

13. An impulse counter according to claim 12, wherein said dial includes means defining an aperture therein, and further comprising a two-colored light transmitting wheel having a different color over diametrically divided halves thereof, said wheel mounted said adjacent said dial and on sleeve for rotation therewith, and a source of light disposed adjacent said color wheel to shine therethrough and through the aperture of said dial.

14. An impulse counter according to claim 12, comprising a cam wheel including at least one cam carried on said sleeve for rotation therewith, a transfer switch positioned to follow said cam wheel and operable in response to said cam, a pair of lamps connected to said switch means and alternately energized thereby in accordance with the angular position of said cam.

* * * * *